(12) United States Patent
Vorenkamp (10) Patent No.: US 7,039,102 B2
(45) Date of Patent: May 2, 2006

(54) HIGHLY INTEGRATED ASYMMETRIC DIGITAL SUBSCRIBER LINE (ADSL) CIRCUIT

(75) Inventor: Pieter Vorenkamp, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 239 days.

(21) Appl. No.: 10/347,293

(22) Filed: Jan. 21, 2003

(65) Prior Publication Data

US 2003/0137322 A1 Jul. 24, 2003

Related U.S. Application Data

(60) Provisional application No. 60/350,339, filed on Jan. 24, 2002.

(51) Int. Cl.
*H04B 1/38* (2006.01)
(52) U.S. Cl. ...................................................... 375/219
(58) Field of Classification Search ................ 375/345, 375/322, 219, 316; 257/691, 678, 690
See application file for complete search history.

(56) References Cited

U.S. PATENT DOCUMENTS

| | | | |
|---|---|---|---|
| 5,162,674 A | * | 11/1992 | Allstot et al. ................ 326/115 |
| 5,899,714 A | * | 5/1999 | Farrenkopf et al. ......... 438/202 |
| 6,366,622 B1 | * | 4/2002 | Brown et al. ................ 375/322 |
| 6,396,137 B1 | * | 5/2002 | Klughart ...................... 257/691 |
| 6,556,635 B1 | * | 4/2003 | Dehghan ...................... 375/345 |
| 6,657,318 B1 | * | 12/2003 | Ishikawa et al. .............. 307/30 |
| 2002/0008256 A1 | * | 1/2002 | Liu .............................. 257/207 |
| 2002/0154620 A1 | * | 10/2002 | Azenkot et al. ............ 370/347 |

FOREIGN PATENT DOCUMENTS

JP 2001024736 A * 1/2001

OTHER PUBLICATIONS

International Search Report issued May 21, 2003 for Appln. No. PCT/US03/01820, 3 pages.

* cited by examiner

*Primary Examiner*—Mohammed Ghayour
*Assistant Examiner*—Pankaj Kumar
(74) *Attorney, Agent, or Firm*—Sterne, Kessler, Goldstein & Fox PLLC (57) ABSTRACT

An asymmetric digital subscriber line (ADSL) transceiver chip is provided that includes a single integrated circuit (IC) substrate to host the circuit and an analog front-end (AFE) configured to receive and transmit analog signals. The AFE has a dynamic range greater than about 85dB and the received analog signals have bandwidths of about 2 megahertz. The ADSL chip also includes a digital signal processor (DSP) configured for digital processing and including bypass capacitors configured to provide switching charge. The AFE and the DSP are formed on the single IC substrate.

27 Claims, 14 Drawing Sheets

HIGHLY INTEGRATED ASYMMETRIC DIGITAL SUBSCRIBER LINE (ADSL) CIRCUIT

CROSS-REFERENCE TO RELATED APPLICATIONS

This application claims the benefit of U.S. Provisional Application No. 60/350,339, filed Jan. 24, 2002, entitled "Highly Integrated Asynchronous Digital Subscriber Line (ADSL) Circuit," which is incorporated by reference herein in its entirety.

BACKGROUND OF THE INVENTION

1. Field of the Invention

The present invention generally relates to communications, and more specifically to a highly integrated asymmetric digital subscriber line (ADSL) circuit chip for communications.

2. Background Art

An ADSL is used for data communications between a central office and customer processing equipment (CPE). At the CPE, an ADSL transceiver transmits and receives ADSL data to and from the central office. Conventional ADSL transceivers are configured on at least two separate semiconductor integrated circuits (IC). More specifically, one IC is usually dedicated to analog processing and the other IC is usually dedicated to digital processing. It would be preferable to combine these two chips into one chip to reduce part count, reduce cost, and improve electrical performance.

BRIEF SUMMARY OF THE INVENTION

The present invention is a single ADSL transceiver chip that includes an analog front-end (AFE) and a digital signal processor (DSP) on the same substrate. A line driver for the ADSL transceiver can be located on a separate substrate. In a preferred embodiment of the invention, the transceiver chip can be implemented in a low voltage complementary metal-oxide semiconductor (CMOS) process that could be, for example, a low voltage CMOS process.

It is highly advantageous to build the analog front-end and the DSP on a single integrated IC because it allows for reduced manufacturing part count, reduced assembly time and reduced costs. The line driver substrates typically require a high voltage semiconductor process (e.g. 18 volts peak-to-peak) in certain applications, because of the need for a sufficient level of voltage to drive the ADSL line. Therefore, the line driver can be formed on a separate substrate.

The AFE and the DSP do not require a high-voltage process, such as the process required by the line driver semiconductor process noted above. For example, the AFE and DSP in the present invention can operate, for example, at about 3.3 volts peak-to-peak, which facilitates their placement on the same substrate and the creation of additional significant economies.

Further features and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and detailed description of the embodiments given below, serve to explain the principles of the present invention.

DETAILED DESCRIPTION OF THE INVENTION

The following detailed description of the accompanying drawings illustrates exemplary embodiments consistent with the present invention. Other inventions are possible, and modifications may be made to the embodiments within the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware and/or the entities illustrated in the figures. Any actual software code with the specialized control hardware to implement the present invention, is not limiting of the present invention. Thus, the operation and behavior of the present invention will be described with the understanding that modifications and variations of the embodiments are possible, given the level detail presented herein.

Figure 1:
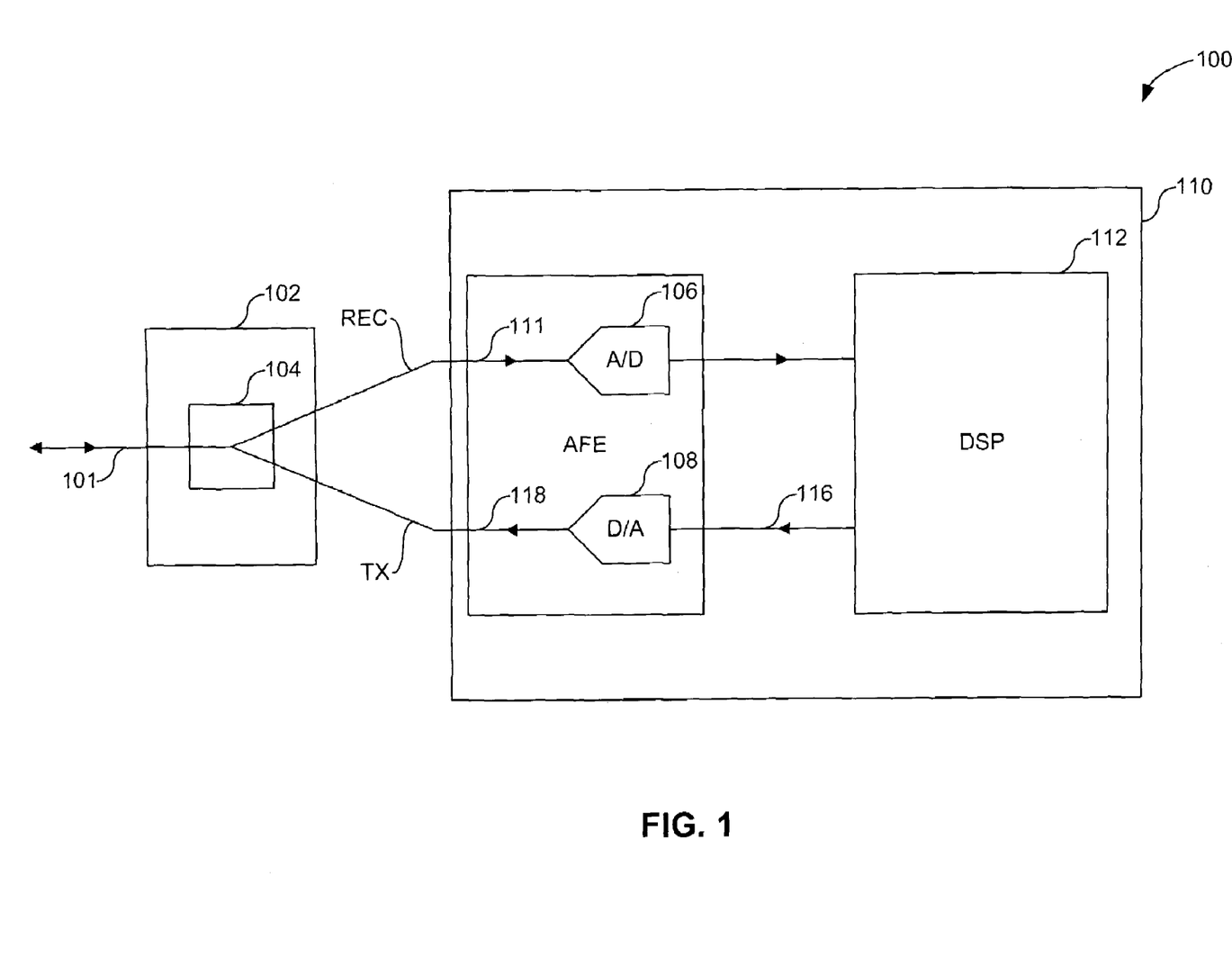
FIG. 1 illustrates an exemplary asymmetric digital subscriber line (ADSL) transceiver according to embodiments of the present invention.

FIG. 1 illustrates an exemplary ADSL transceiver 100 according to embodiments of the present invention. The ADSL transceiver 100 operates at the CPE, and transmits/receives data to/from the central office over an ADSL line 101. The transceiver 100 includes a line driver substrate 102 and an ADSL transceiver chip 110 substrate. The line driver substrate 102 includes a hybrid circuit 104 that separates the transmit data from the receive data.

Figure 2:
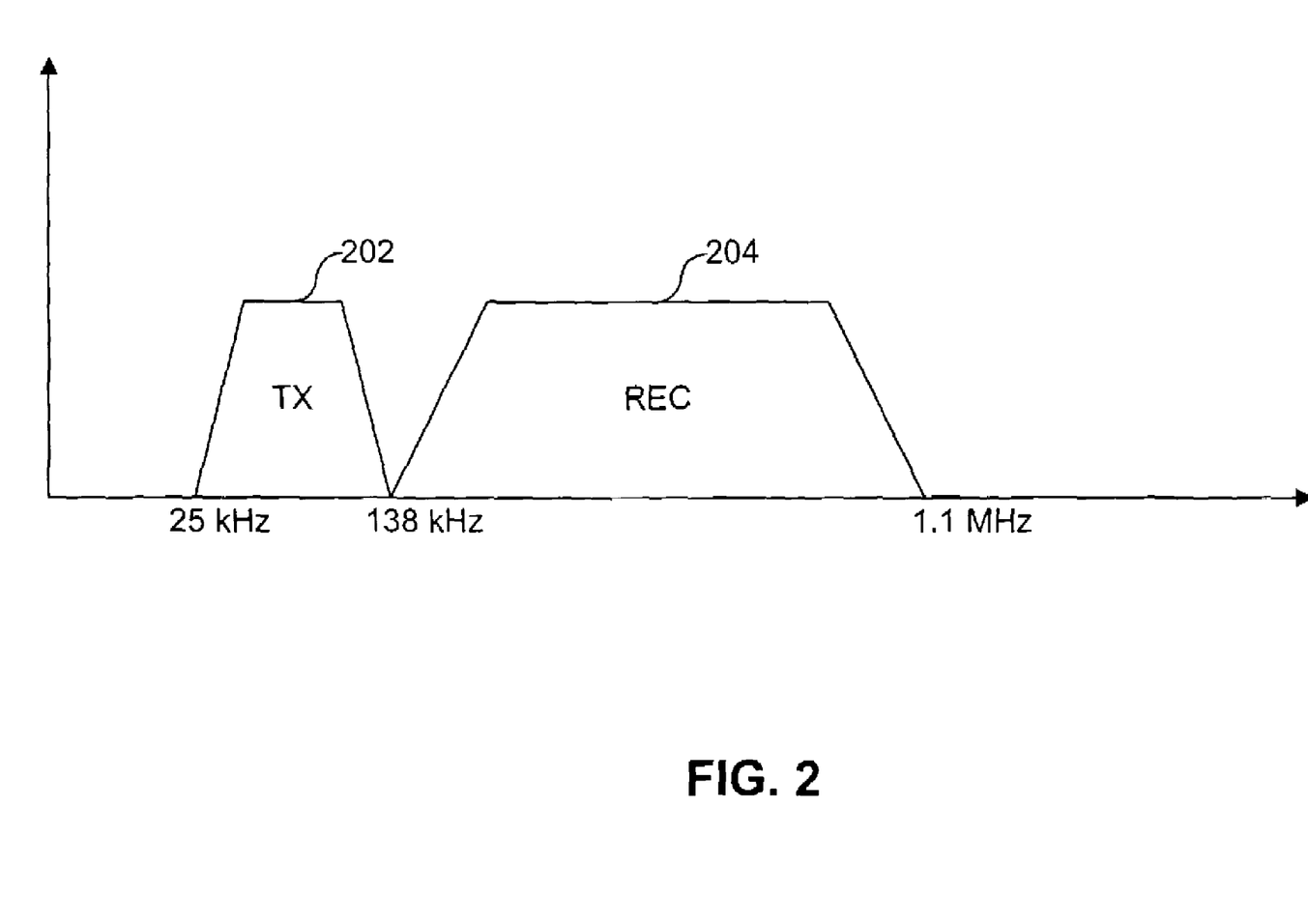
FIG. 2 illustrates exemplary transmit and receive spectrums for the ADSL of FIG. 1.

In the preferred embodiment, as illustrated in FIG. 2, transmit data 202 is sent from the CPE to the central office and occupies an exemplary bandwidth of about 25 kilo hertz (kHz) to 138 kHz. Receive data 204, received from the central office, occupies a bandwidth from about 138 kHz to 1.1 mega hertz (MHz). In other words, the receive data 204 has a total signal bandwidth of about 1 MHz. In terms of signal quality, the present invention can achieve a dynamic range of about 90 dB while operating at the high, roughly 1 MHz, bandwidths. the frequency difference between the transmit data 202 and the receive data 204 allows for the transmit and receive data to occupy the same transmission line. The hybrid circuit 104 can include a transmit filter with a passband for transmit data and a receive filter having a passband for the receive data 204.

The AFE 105 includes an analog-to-digital (A/D) converter 106 and a digital-to-analog (D/A) converter 108. The A/D converter 106 receives analog data 111 from the hybrid circuit 104 that was received over the ADSL line 101. The A/D converter 106 samples the received data 111, and generates a quantized digital signal 114 representative of the received data 111. The digital signal 114 is then sent to the DSP 112 for further processing. For transmissions, the D/A converter 108 receives the digital data 116 from the DSP 112 that is meant to be transmitted to the central office over the ADSL line 101. The D/A converter 108 converts the digital data 116 to an analog signal 118 that is transmitted to the central office over the ADSL line 101.

High signal bandwidth and dynamic range requirements, such as those in the present invention, typically make integration of AFEs and DSPs prohibitive. In the instant invention, however, the inventors have managed to achieve the ultimate in AFE and DSP integration—designing the transceiver chip 110 to include an AFE 105 and a DSP 112 on the same IC substrate.

In a preferred embodiment of the present invention, the transceiver chip 110 is a CMOS process, although the present invention is not limited to CMOS. The process can include, for example, a low voltage CMOS implementation. It is highly advantageous to build the AFE 105 and the DSP 112 on a single IC chip because it allows for significant economies such as reduced manufacturing part count, reduced assembly time, and reduced costs. The line driver substrate 102, on the other hand, requires a high voltage semiconductor process (e.g. 18 volts peak-to-peak) in some applications because of the need for adequate voltage to drive the ADSL line 101.

The AFE 105 and the DSP 112, however, do not require the high-voltage process needed to power the line driver substrate 102. Consequently, the AFE 105 and the DSP 112 can be designed using, for example, a 0.18 micron device design process, which in-part, permits their placement on the same IC substrate. That is, because of the selection of the 0.18 micron design process, the transceiver chip 110 can be manufactured to have a core device that runs off 1.8 volts and input/output (I/O) devices that run off about 3.3 v peak-to-peak. These relatively low core device and I/O device voltage levels contribute to the ability to integrate the AFE 105 and the DSP 112 on the same IC substrate, thus facilitating the significant economies, such as those noted above. Numerous other inventive techniques, however, enable the inventors of the instant invention to overcome the challenges of forming the AFE 105 and the DSP 112 on the same substrate.

One particular challenge to integrating the AFE 105 and the DSP 112 on the same IC substrate, especially under the high bandwidth and dynamic range constraints of the present invention, is reducing digital noise. Digital noise can occur as a result of the activity and operation of the digital circuitry (within the DSP 112) and their corresponding voltage values, which can swing from zero to their core supply levels. Since the digital circuits are coupled to the same substrate as the analog circuits, the digital noise can couple to the analog circuits and create an impairment in the transceiver chip's analog performance. For example, digital noise can easily erode the system's dynamic range performance.

Figure 3:
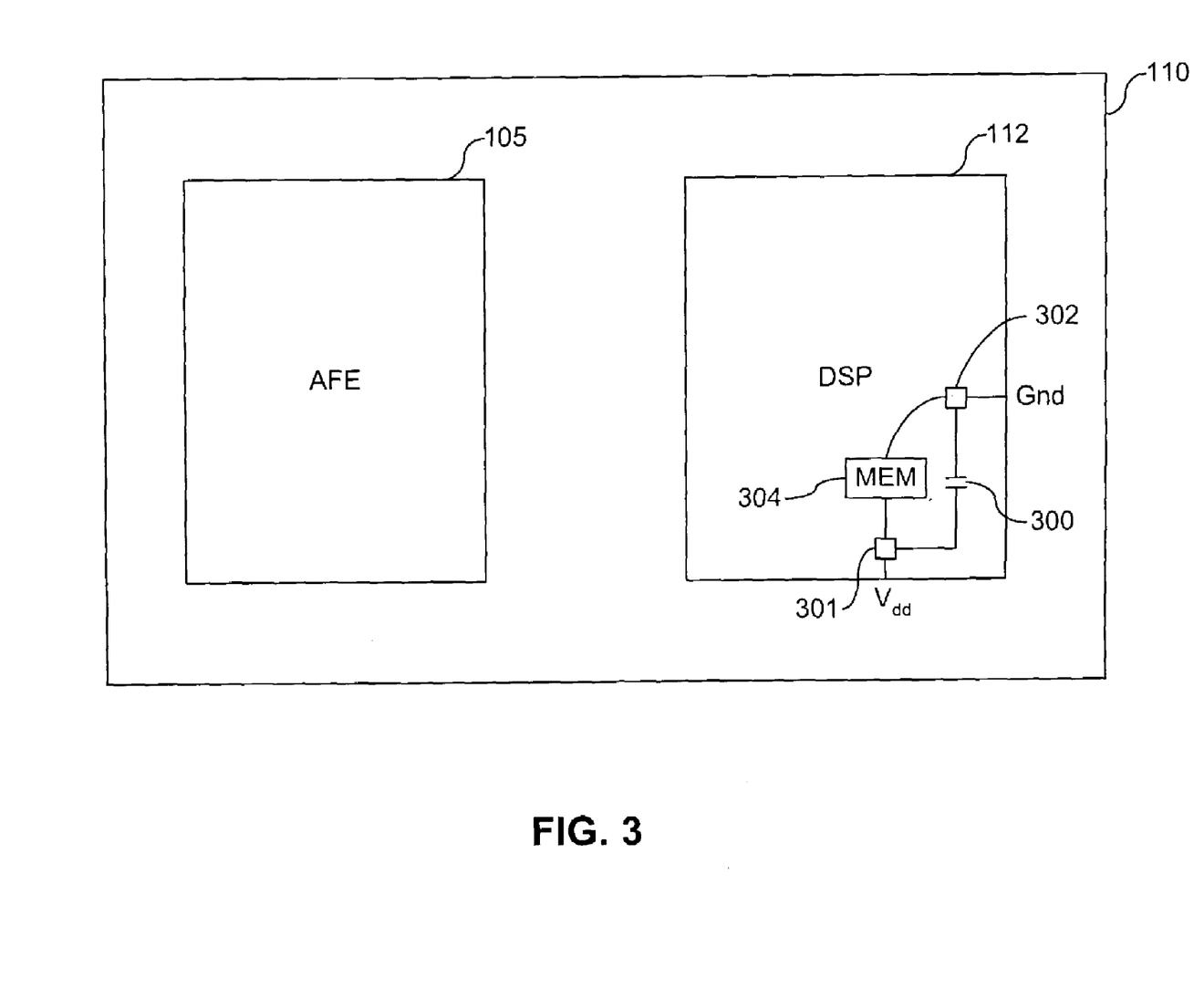
FIG. 3 illustrates exemplary bypass capacitors used in an embodiment of the present invention.

FIG. 3 illustrates a technique for isolating digital noise associated with forming the AFE 105 and the DSP 112 on the same IC. In FIG. 3, at least one bypass capacitor (cap) 300 is connected to the power supplies of random access memories, such as the memory block 304, and other typically noisy standard cell substrate areas. In the example of FIG. 3, the bypass cap 300 is connected between a Vdd terminal 301 and a ground (Gnd) terminal 302 of the memory block 304.

The bypass cap 300 performs as miniature local battery providing impulse current for operation of the DSP 112. That is, when components within the DSP 112 require AC surge current, for example, the surge current can be extracted from the bypass cap 300. That is, this surge current is drawn from the bypass cap 300 instead of being drawn from "off-chip." As understood in the art, current and voltages that are received off-chip have to run off the chip's pad rings and associated bond wires, which creates paths for energy coupling to the digital circuitry. In the instant invention, this energy coupling is reduced through use of the bypass cap 300.

Figure 4A:
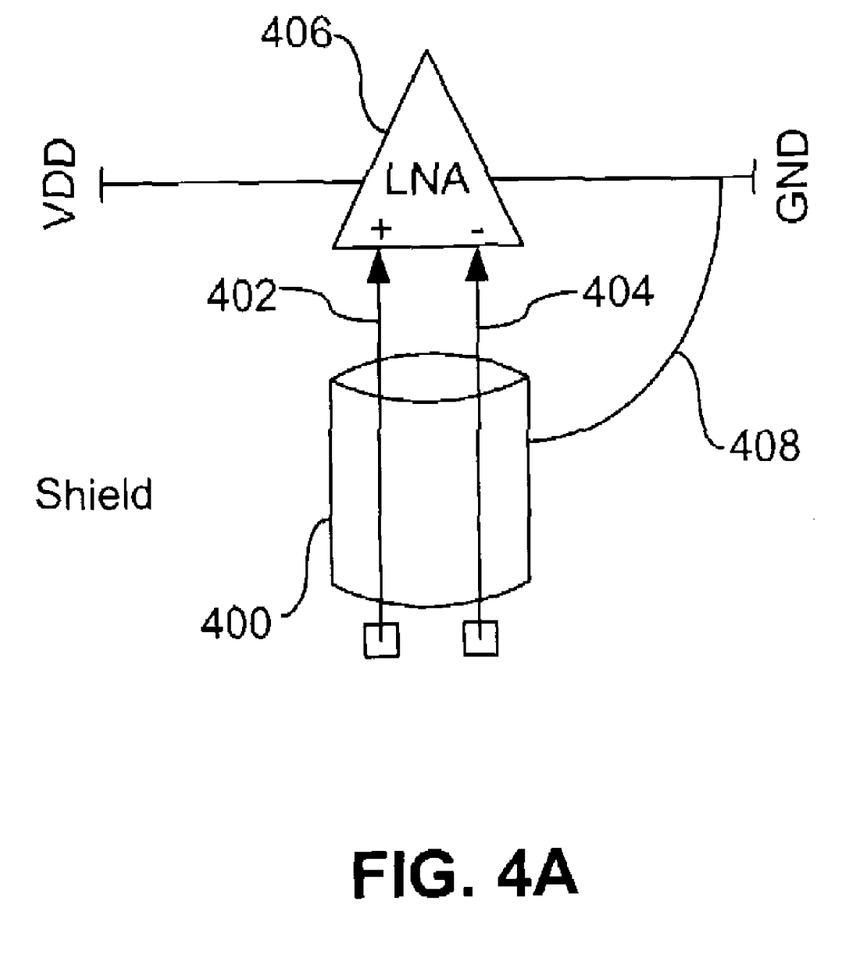
FIG. 4A is a block diagram of a metallic structure used to shield selected electrical paths in an exemplary embodiment of the present invention.

FIG. 4A is an illustration of an exemplary metallic shield 400 for protecting sensitive internal electrical paths of the AFE 105. The AFE 105 is constructed in a manner where some of its internal electrical paths are more sensitive than others to analog circuit noise. Analog circuits inherently produce noise, especially when the analog outputs are swinging in voltage from rail-to-rail. The shield 400 is provided for forming a shield around these sensitive paths to isolate any electrical noise and reduce the probability of the noise coupling to the sensitive electrical paths. More specifically, the shield 400 is provided to prevent this undesirable electrical energy from coupling into analog signal paths such as the exemplary analog signal lines 402 and 404 or clock paths.

In the exemplary embodiment of FIG. 4A, the shield 400 is constructed in the form of a coaxial metallic tube-like workpiece, or container, for shielding the path created by differential signal lines 402 and 404. The differential signal lines 402 and 404 can be used to connect, for example, to a low noise amplifier 406, or some other component within the AFE 105. A connection 408 is established to connect the metallic shield 400 to ground.

Figure 4B:
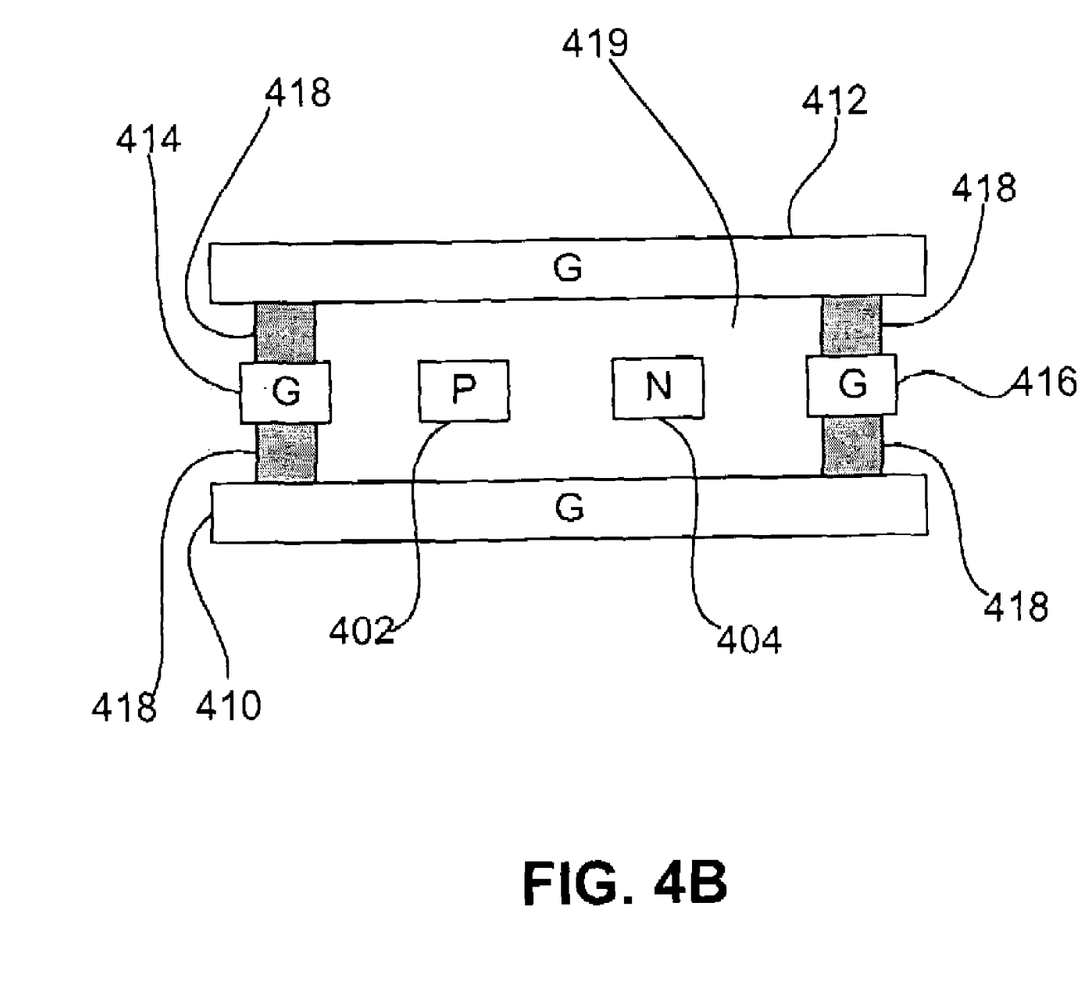
FIG. 4B is a top view of the illustration of FIG. 4A.

FIG. 4B illustrates a side view of the exemplary shield 400 shown in FIG. 4A. In FIG. 4B, selected electrical paths, such as the signal lines 402 and 404, are shielded by a metallic layer 410, and a metallic layer 412 on an opposite side of the layer 410. The shield 400 also includes thin metallic layers 414 and 416 that are connected between the layers 410 and 412, as shown, using standard inter layer metal connections 418, also known as VIAs. A bore 419, or interior portion of the shield 400, is provided as a pathway through which the signal lines 402 and 404 may pass. The metal components of the shield 400 may be created using any suitable conductive and/or metallic material.

Figure 4C:
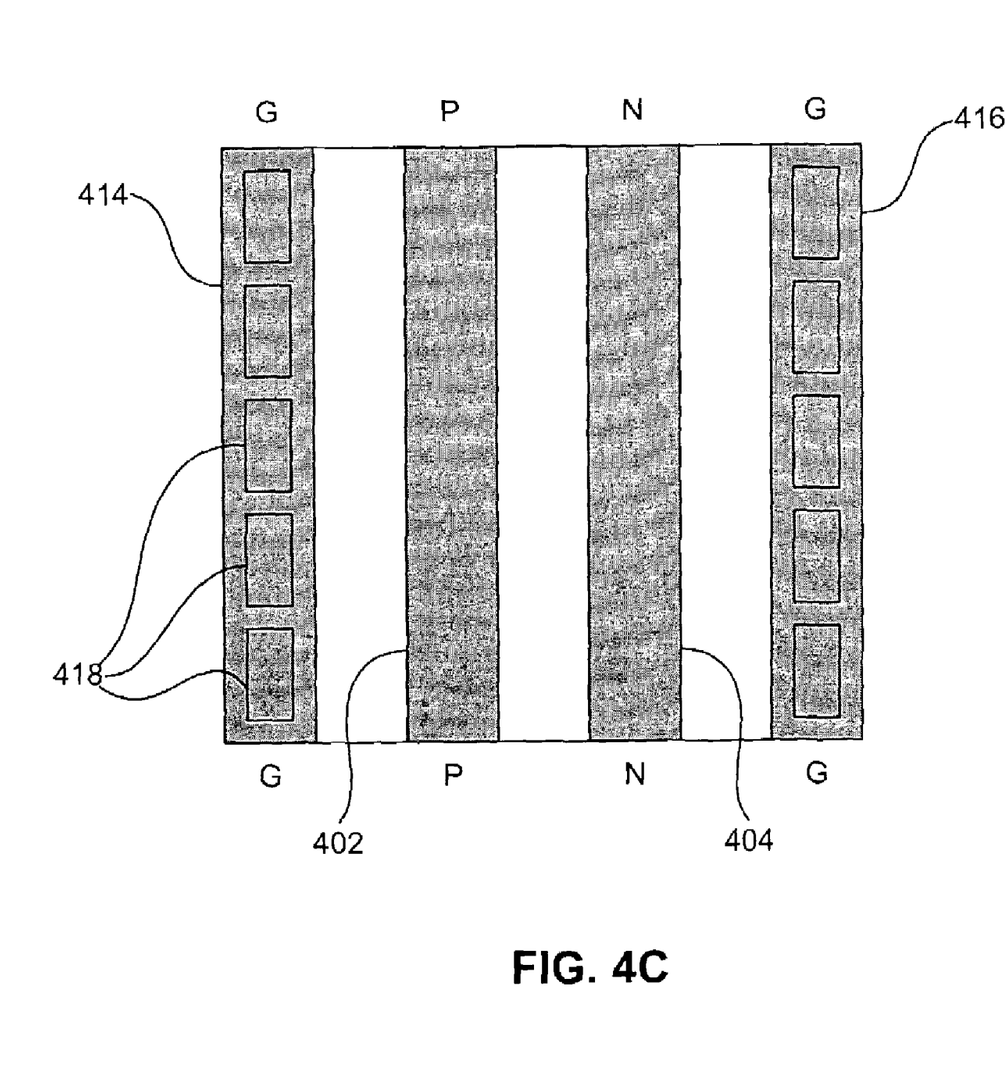
FIG. 4C is a side view of the illustration of FIG. 4A.

FIG. 4C is a top view of the metallic shield 400, illustrating an exemplary disposition of the inter layer metal connections 418 between the layers 410 and 412. As previously noted, the metallic layer 400 is used to shield selected electrical paths of the AFE 105 from the effects of noise coupling. Differential inputs lines are illustrated in FIGS. 4A–4B for purposes of illustration only. In practice, the shield 400 can be applied to any number and/or type of sensitive electrical paths within the AFE 105.

Figure 5A:
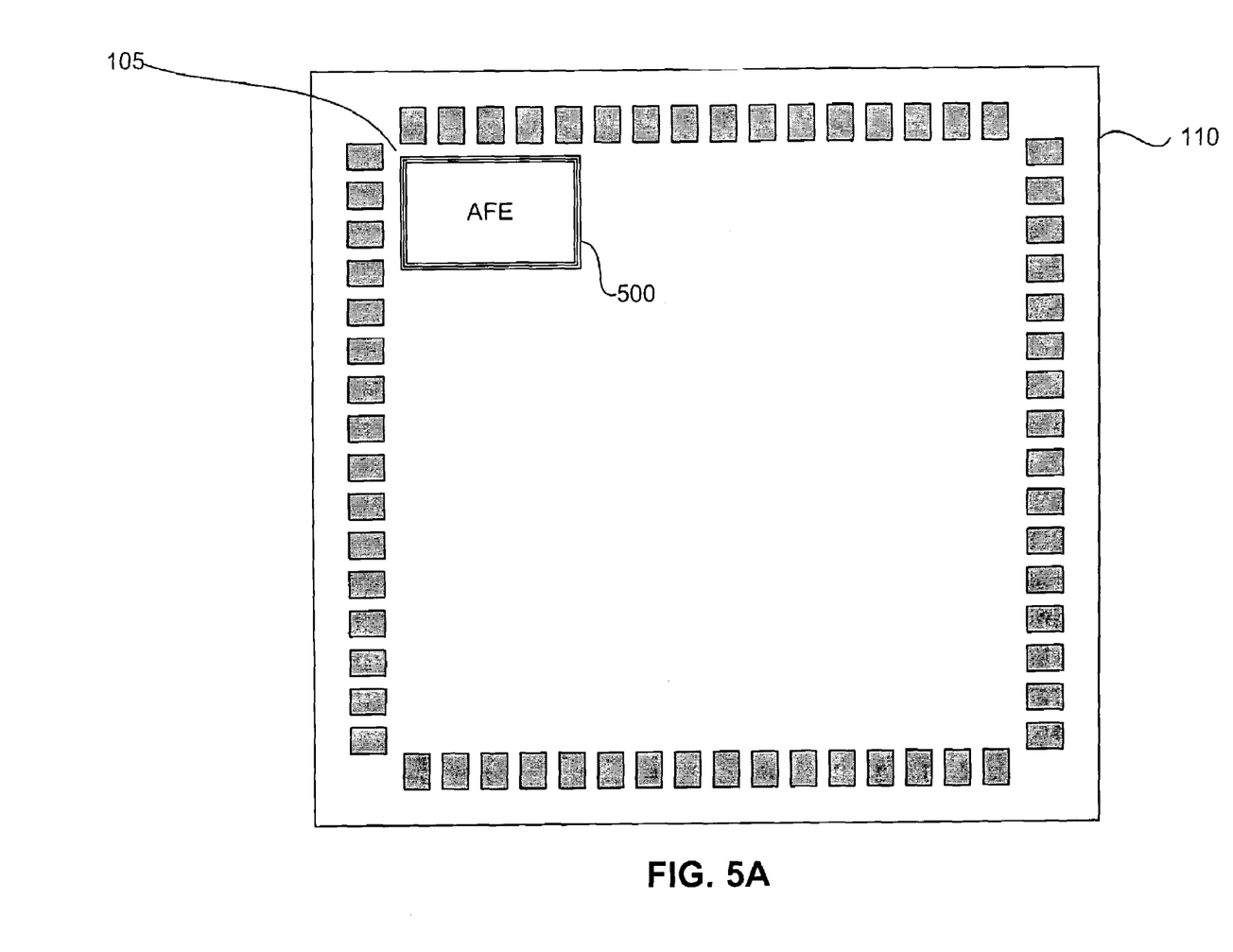
FIG. 5A is a block diagram of a noise isolation moat used in an exemplary embodiment of the present invention.
Figure 5B:
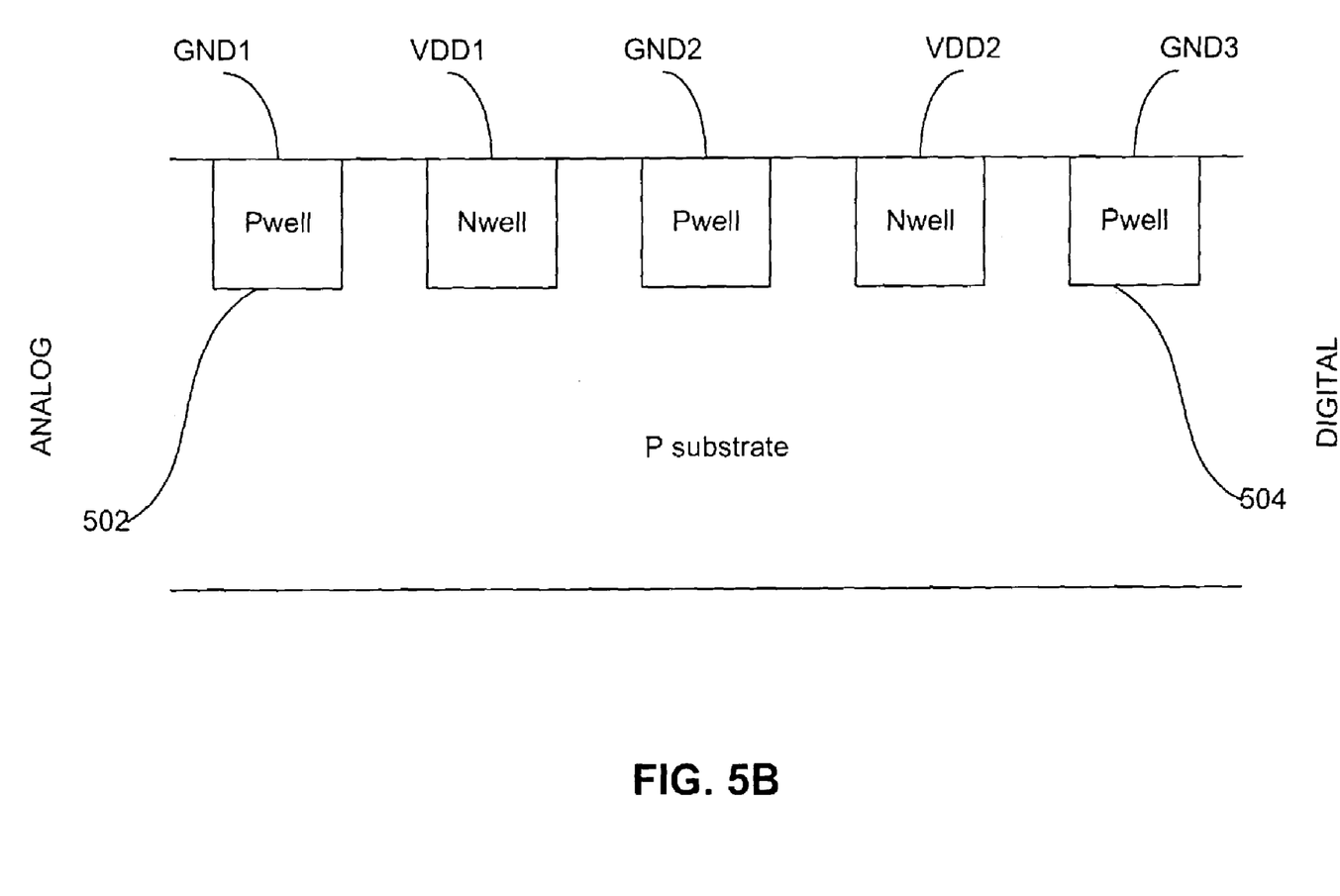
FIG. 5B is a more detailed view of the isolation moat shown in FIG. 5.

FIG. 5A illustrates another technique used to create an environment where the AFE 105 and the DSP 112 can be formed on the single IC substrate 110. In the exemplary embodiment shown in FIG. 5A, the entire AFE 105 is physically surrounded by an isolation moat 500 to separate the AFE 105 from the DSP 112. The isolation moat 500 is formed of a plurality of digital gates. The digital gates are arrayed as concentric rectangular structures, housing the AFE 105 in their center in order to absorb digital noise created by operation of the DSP 112. FIG. 5B provides a more detailed view of the isolation moat 500.

As shown in FIG. 5B, the exemplary isolation moat 500 is formed of P-well conductors 502 and N-well conductors 504 alternately disposed and implanted within the IC substrate 110. Positioning in this manner enables the P-wells 502 and the N-wells 504 to electrically separate the analog and digital portions of the IC substrate 110. The P-wells and N-wells are typically interconnected using a three terminal device, such as a diode (not shown). In FIG. 5B, the substrate 110 is formed of a p-type layer, although the present invention is not limited to such an implementation. In the embodiment of FIG. 5B, the P-wells 502 are connected to ground and the N-wells 504 are connected to Vdd. During operation of the isolation moat 500, the P-wells 502 and N-wells 504 electrically cooperate to prevent digital noise, created by operation of the DSP 112, from interfering with operation of the AFE 105. Any noise is absorbed within the P-wells 502 and the N-wells 504.

Noise that can potentially interfere with the AFE 105 can also be created by the very act of passing logic signals from the digital side to the analog side of the ADSL transceiver 100. For example, when a logic control signal is passed from the digital side to the analog side, its actual signal transmission line can become a conduit of digital noise. The present invention, therefore, includes a mechanism to reproduce signals produced by the DSP 112 before these signals are used within the AFE 105.

Figure 6:
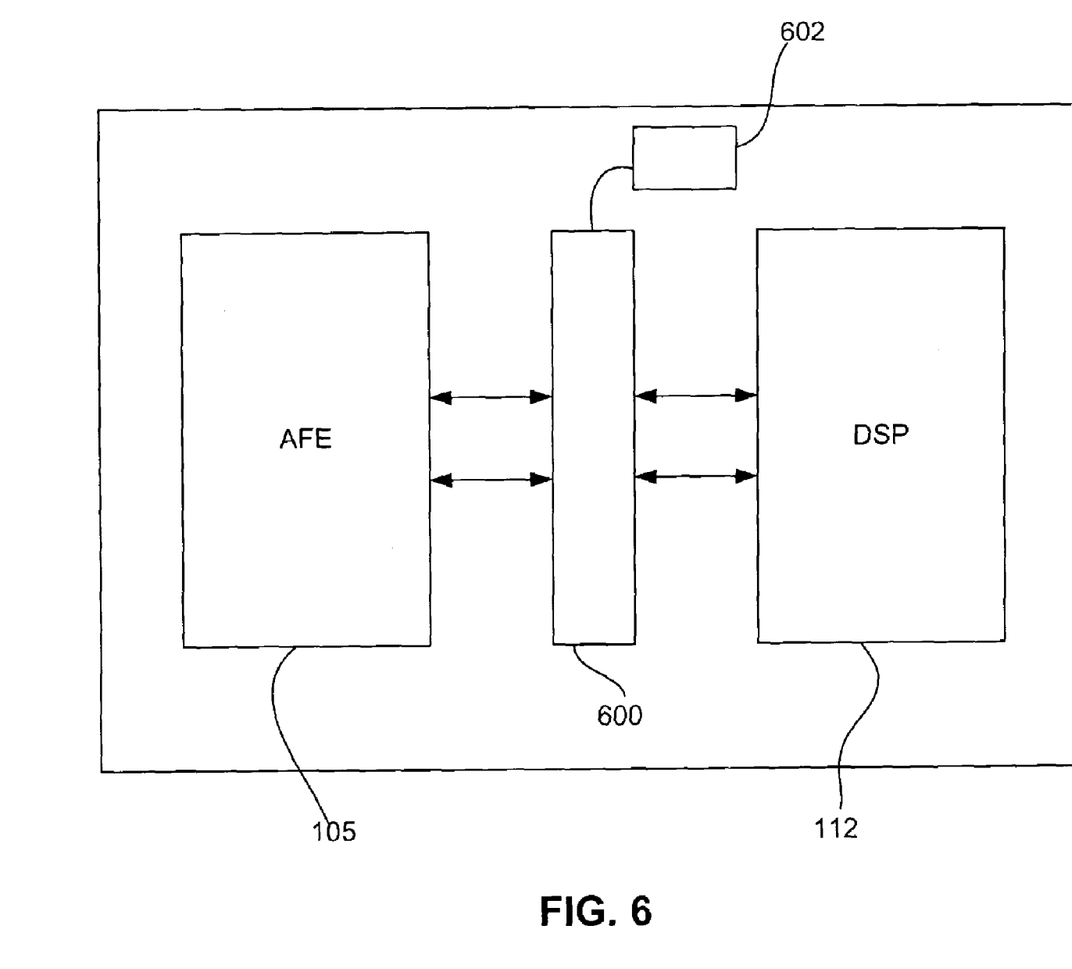
FIG. 6 is a block diagram of signal reproduction buffers used in an exemplary embodiment of the present invention.

FIG. 6 shows a buffer section 600 to buffer or reproduce the digital data 116, or logic signals, passed from the DSP 112 to the AFE 105. The buffers 600 are connected to quiet analog power supplies 602 to minimize the possibility of additional noise being created through the buffering process. In the exemplary embodiment of FIG. 6, the buffer 600 is implemented using an inverter. However, the buffer 600 can be implemented using any suitable device. In this manner, the digital data 116 produced by the DSP 112 is reproduced on the analog supplies 602 and converted into quieter signals before being used in the AFE 105.

Figure 7:
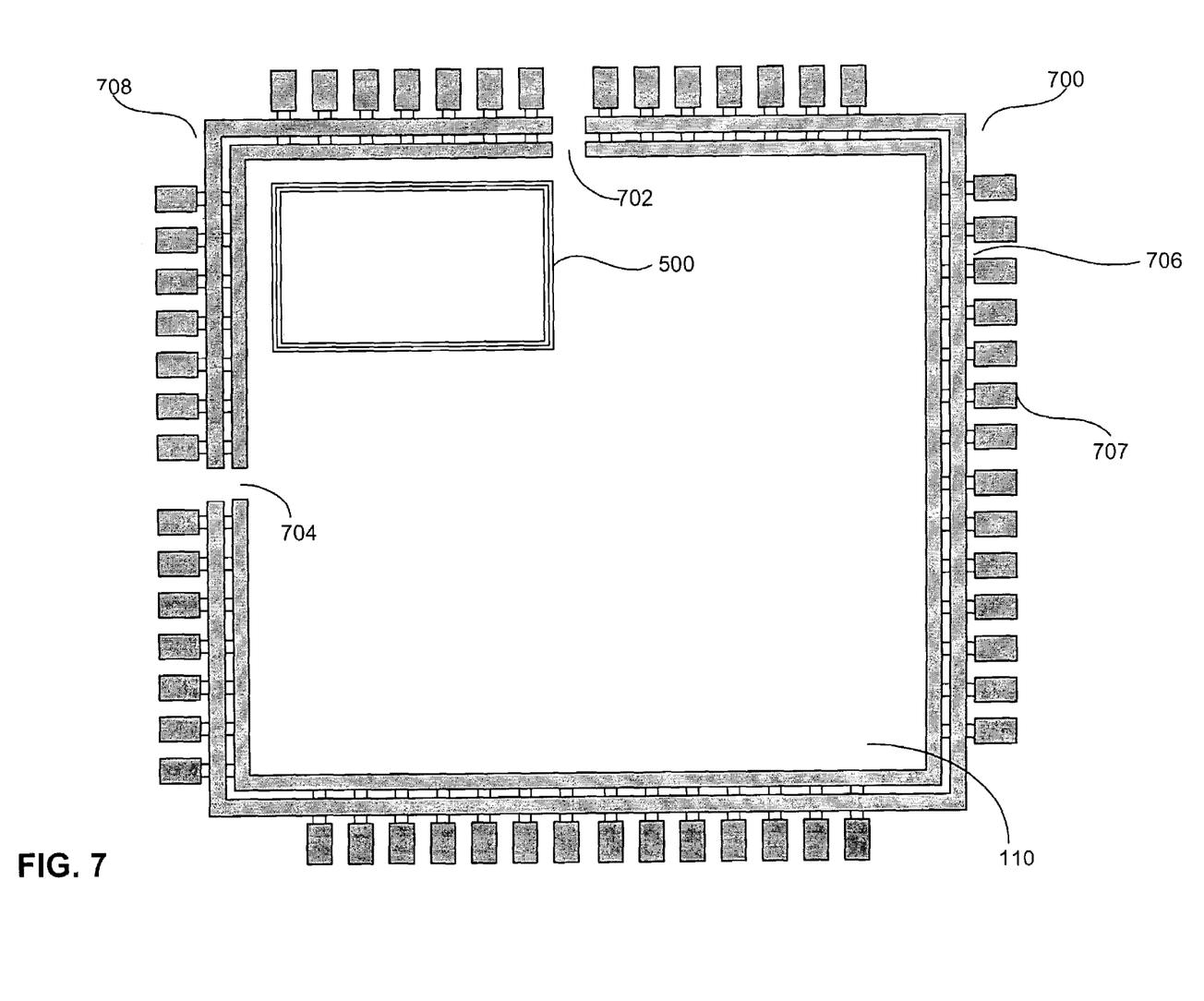
FIG. 7 illustrates a multiple-section padring configuration used in an exemplary embodiment of the present invention.

FIG. 7 is an illustration of a technique of the present invention to reduce crosstalk between the AFE 105 and the DSP 112. In FIG. 7, the IC substrate 110 includes a padring 700. As known, padrings are components where electrical, timing, and logical features of the IC are integrated. In the exemplary embodiment of FIG. 7, the padring 700 includes power supply padring breaks 702 and 704 to divide the padring 700 into multiple disjointed sections. The multiple disjointed padring sections, including a digital section 706 and an analog section 708, help isolate power supplies within the AFE 105 and the DSP 112 in order to reduce crosstalk between digital and analog padring portions of the IC substrate 110.

In the present invention, the digital section 706 is configured to handle the processing of full-scale digital signals and the analog section 708 is configured to handle analog signals. Since pads 707, within the digital section 706, can experience full voltage swings from ground to Vdd, the padring breaks 702 and 704, prevent voltages from capacitively coupling to the analog section 708.

Next, as illustrated in the exemplary embodiments of FIGS. 5A and 7, the AFE 105 is physically located at a corner of the IC 110 for maximum isolation from noisy portions of the IC and from the DSP 112. While the embodiments of FIGS. 5A and 7 show the AFE 105 in a particular corner of the IC 110, the AFE 105 can be positioned in any suitable location to provide an adequate level of physical isolation from noise generated by the DSP 112.

Figure 8:
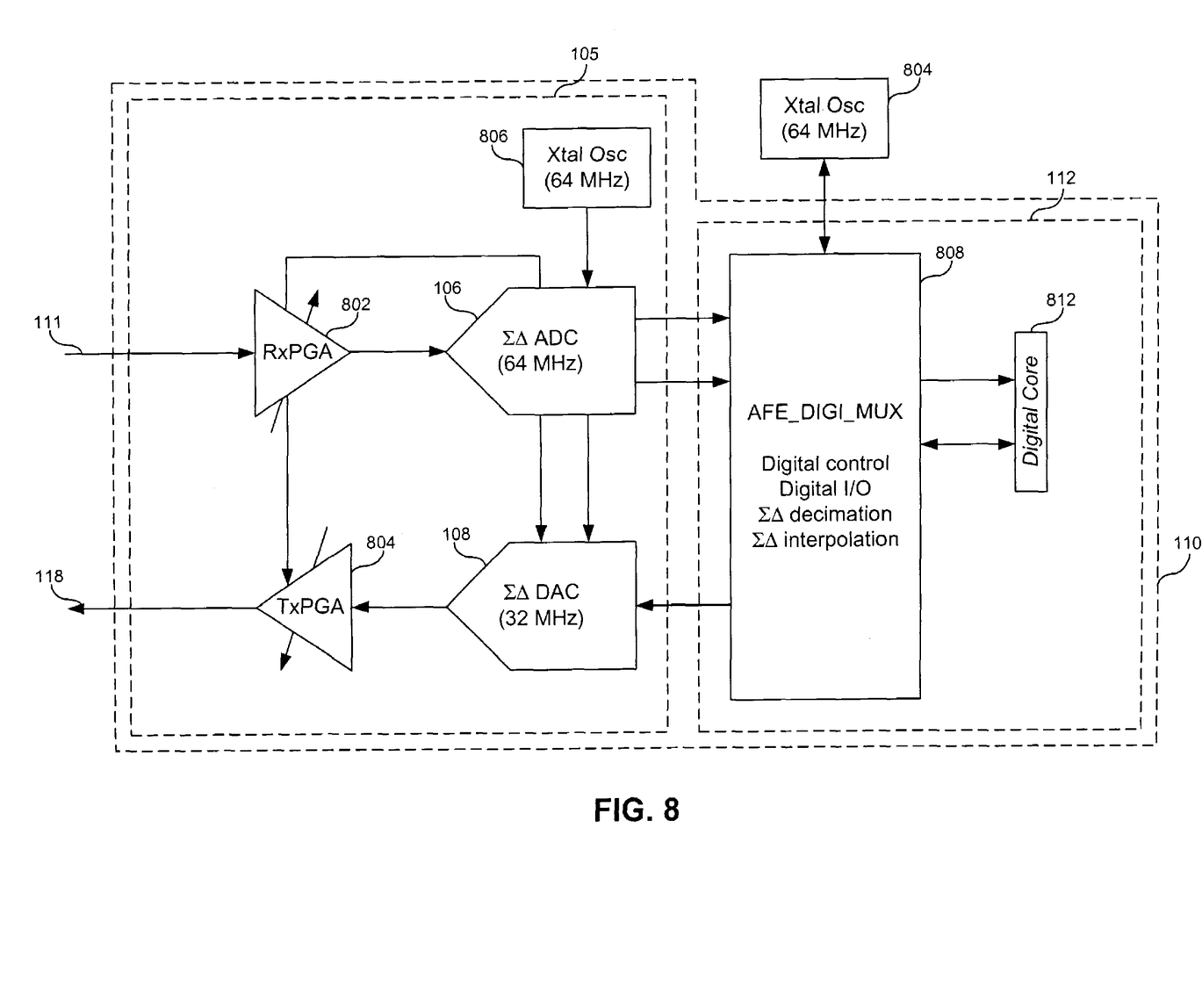
FIG. 8 illustrates an exemplary analog front-end for the ADSL transceiver chip of the present invention.

FIG. 8 further illustrates the transceiver chip 110, and further defines additional details of the AFE 105 and the DSP 112. In addition to the A/D converter 106, the AFE 105 also includes a receive programmable gain amplifier (PGA) 802 in the receive path, and a transmit PGA 804 in the transmit path. One embodiment of the PGAs 802 and 804 is further described in U.S. patent application Ser. No. 10/208, 042, entitled System and Method for a Programmable Gain Amplifier, filed Jul. 31, 2002 and U.S. patent application Ser. No. 10/208,044, entitled System and Method for a Start-Up Circuit for a Differential CMOS Amplifier, filed Jul. 31, 2002, which are incorporated by reference herein in their entirety.

Figure 9:
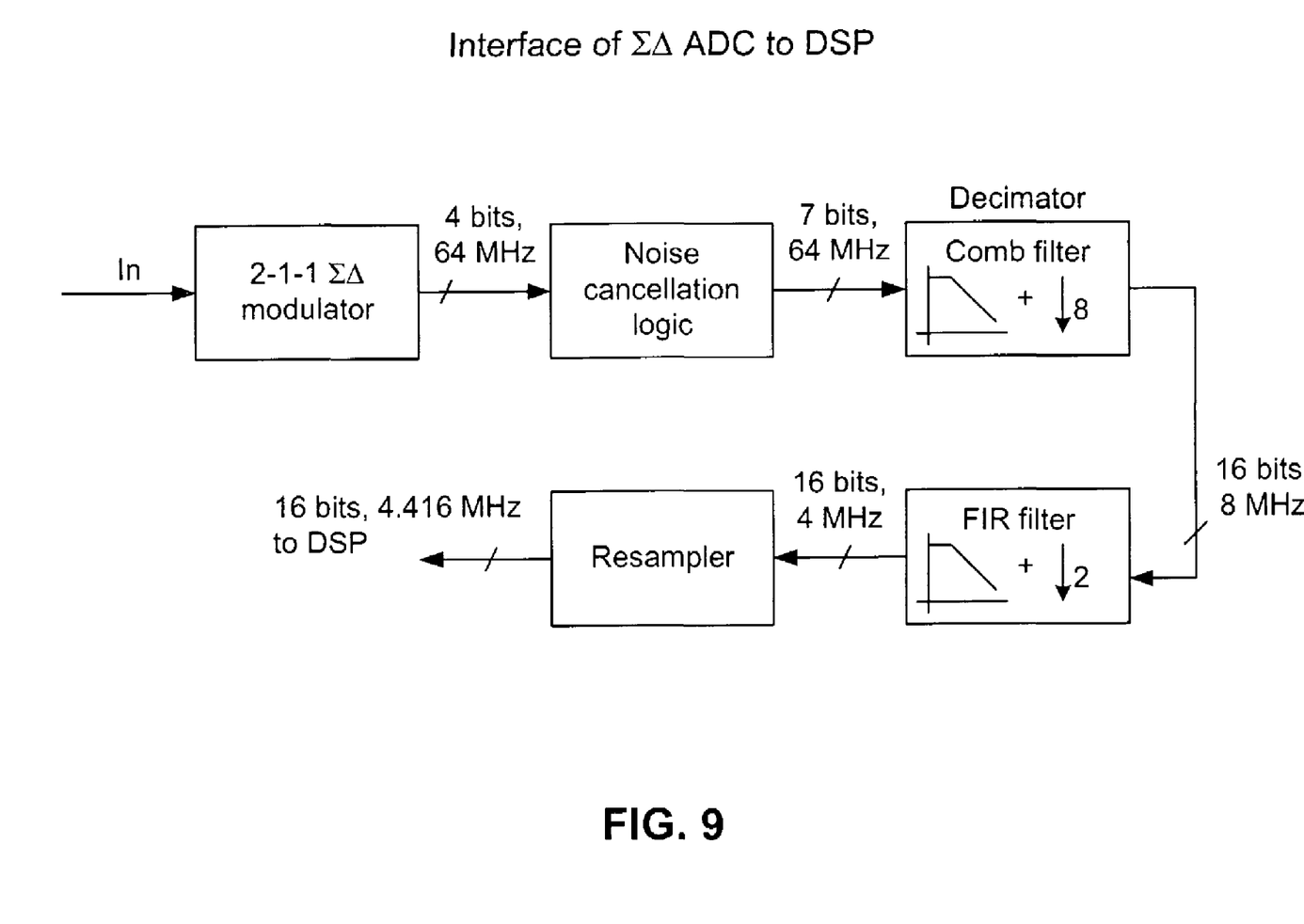
FIG. 9 illustrates an exemplary interface for the analog-to-digital (A/D) converter to the DSP.
Figure 10:
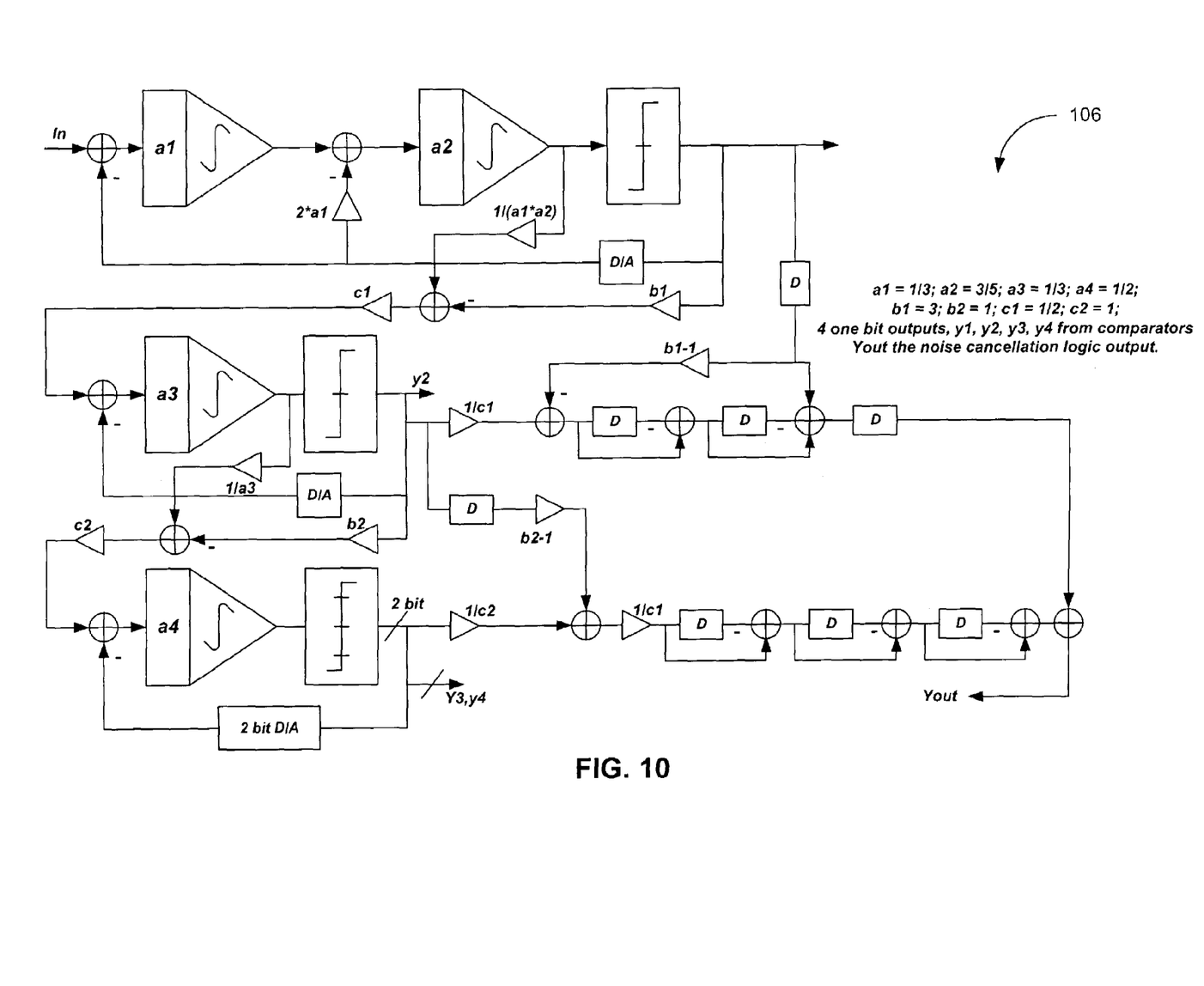
FIG. 10 further illustrates an exemplary A/D converter.

The receive PGA 802 is connected to the input of the A/D converter 106, and the transmit PGA 804 is connected to the output of the D/A converter 108. The AFE 105 also includes a crystal oscillator 806 that drives the A/D converter 106. One embodiment of the A/D converter 106 is further described in U.S. patent application Ser. No. 10/043,229, entitled, Gain Scaling for Higher Signal-To-Noise Ratios in Multistage, Multi-Bit Delta Sigma Modulators, filed Jan. 14, 2002, which is incorporated by reference herein in it's entirety. FIG. 9 illustrates the interface between the A/D converter 106 and the DSP 112. FIG. 10 illustrates an analog modulator that is one embodiment of the A/D converter 106, where y1, y2, y3, and y4 are the outputs.

The DSP 112 includes an AFE digi-mux 808 and a digital core 812. The digi-mux 808 performs digital control, digital input/output (I/O) multiplexer (mux) control, sigma-delta decimation, and sigma-delta interpolation. The digital core 812 processes the digital signals received from/transmitted to the digi-mux 808.

Figure 11:
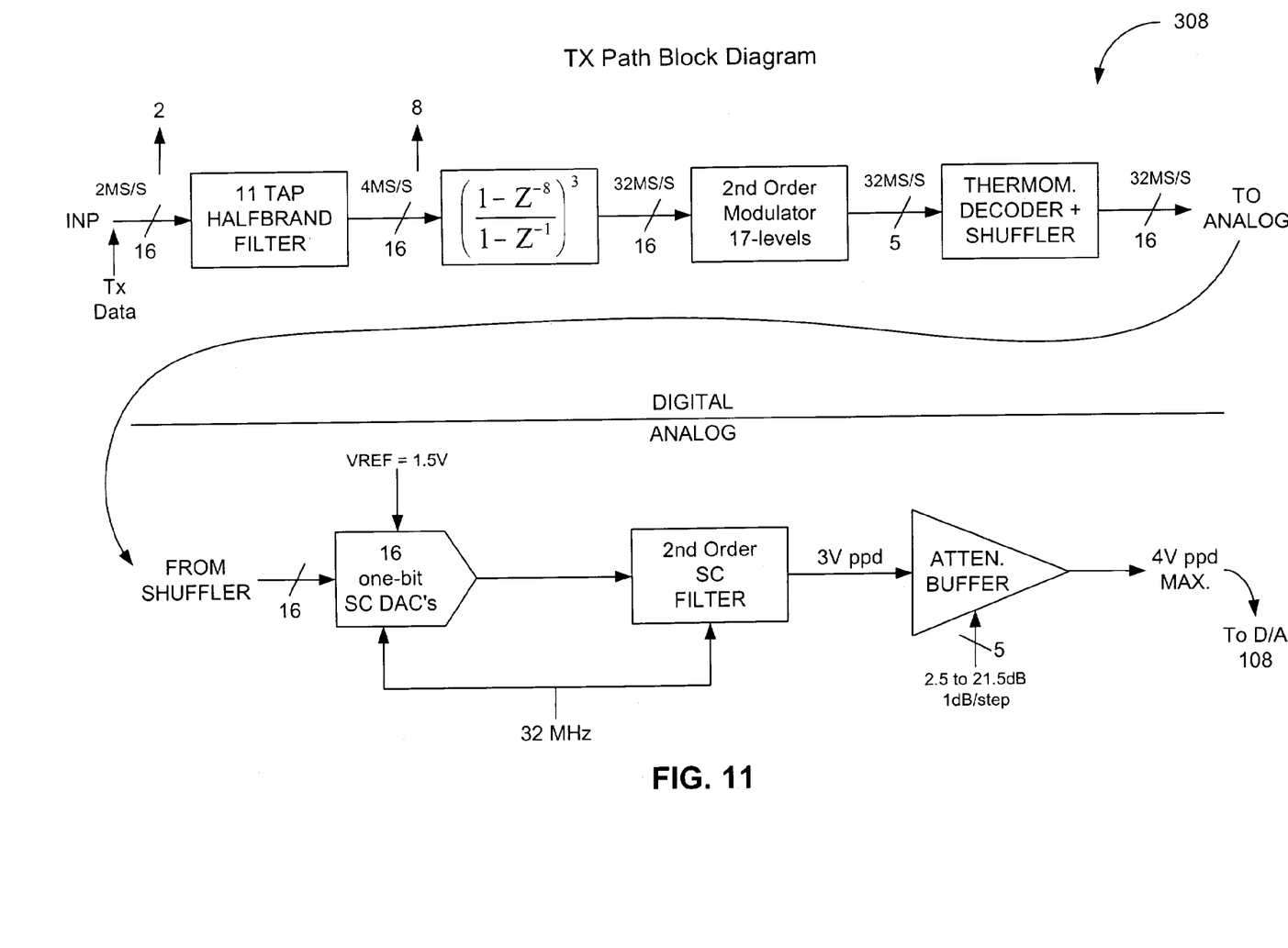
FIG. 11 illustrates an exemplary transmit path in the DSP.

FIG. 11 illustrates an exemplary transmit path through the AFE digi-mux 808 and the digital core 812. In this example, the receive path through the AFE digi-mux 808 and the digital core 812 is a recombination and decimation filter for the A/D converter 106 that converts 4 bits at 64 MHz to 16 bits at 4 MHz, with a signal bandwidth of 25 kHz to 1.1 MHz.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by analog and/or digital circuits, discrete components, application specific integrated circuits, firmware, processors executing appropriate software and the like or any combination thereof Thus, the breadth and scope of the present invention should not be limited by any of the above-described exemplary embodiments, but should be defined only in accordance with the following claims and their equivalents.

What is claimed is:

1. An asymmetric digital subscriber line (ADSL) circuit, comprising:
   a single integrated circuit (IC) substrate to host the circuit;
   an analog front-end (AFE) configured for analog operations and having a dynamic range of at least about 90 dB;
   wherein the analog operations include at least one of receiving and transmitting signals having predetermined characteristics;
   wherein the predetermined characteristics include receiving signals having bandwidths of at least about 1 mega-hertz; and
   a digital signal processor (DSP) configured for digital processing and including bypass capacitors configured to provide charge for digital switching current;
   wherein the switching charge is supplied to the DSP for operation thereof; and
   wherein the AFE and the DSP are formed on the single IC substrate.

2. An asymmetric digital subscriber line (ADSL) circuit, comprising:
   a single integrated circuit (IC) substrate to host the circuit;
   an analog front-end (ME) configured to receive and transmit analog signals;
   wherein the AFE has a dynamic range greater than about 85 dB; and
   wherein the received analog signals have bandwidths of about 2 mega-hertz; and
   a digital signal processor (DSP) configured for digital processing and including bypass capacitors configured to provide switching charge;
   wherein the AFE and the DSP are formed on the single IC substrate; and
   wherein the AFE includes a mechanism for shielding one or more analog signal paths.

3. The ADSL circuit of claim 2, wherein the mechanism is formed of a tube-like metallic workpiece having an exterior structure and a bore therethrough.

4. The ADSL circuit of claim 3, wherein the exterior structure is formed of a number of metal layers interconnected by one or more connecting pieces.

5. The ADSL circuit of claim 4, wherein the exterior structure is electrically connected to at least one of Vdd and Gnd of a receiver of the AFE.

6. The ADSL circuit of claim 2, wherein the IC substrate includes an isolation moat surrounding the AFE.

7. The ADSL circuit of claim 6, wherein the isolation moat is formed of a plurality of digital gates.

8. The ADSL circuit of claim 7, wherein the digital gates are arrayed in the form of concentric structures, the AFE being disposed in the center thereof.

9. The ADSL circuit of claim 8, wherein the concentric structures are rectangular in shape.

10. The ADSL circuit of claim 8, wherein each of the concentric structures is formed of one of a P-well and an N-well.

11. The ADSL circuit of claim 10, wherein adjacent concentric structures are formed of opposite ones of the P-wells and N-wells.

12. The ADSL circuit of claim 11, wherein the IC substrate is formed of one or more p-type layers.

13. The ADSL circuit of claim 12, wherein the digital gates are configured to produce an electrical field for shielding the AFE from the effects of external noise.

14. The ADSL circuit of claim 13, wherein the external noise is produced by the DSP.

15. The ADSL circuit of claim 2, wherein the DSP is configured to pass digital signals to the AFE.

16. The ADSL circuit of claim 15, further comprising a buffer configured to (i) receive one or more of the digital signals, (ii) reproduce the received digital signals, and (iii) pass the reproduced digital signals to the AFE.

17. The ADSL circuit of claim 2, wherein the IC substrate includes a padring having (i) multiple portions and (ii) a mechanism configured to prevent electrical coupling between the multiple portions.

18. The ADSL circuit of claim 2, wherein the IC substrate includes a padring having a plurality of disjointed sections.

19. The ADSL circuit of claim 18, wherein the disjointed sections are non-touching.

20. The ADSL circuit of claim 19, wherein one of the sections is configured to accommodate digital operations and another of the sections is configured to accommodate analog operations.

21. The ADSL circuit of claim 20, wherein the ADSL circuit is formed of a CMOS process.

22. An asymmetric digital subscriber line (ADSL) circuit having a dynamic range greater than about 90 DB and configured to receive signals having bandwidths of about 1 mega-hertz, the ADSL comprising:
   a single integrated circuit (IC) substrate to host the circuit;
   an analog front-end (AFE) configured for analog operations; and
   a digital signal processor (DSP) configured for digital processing and including bypass capacitors configured to provide switching charge;
   wherein the AFE and the DSP are formed on the single IC substrate; and
   wherein the AFE includes a mechanism for shielding one or more analog signal paths.

23. The ADSL circuit of claim 22, wherein the ADSL circuit is formed of a CMOS process.

24. The ADSL circuit of claim 23, wherein the AFE in positioned in a corner location of the IC substrate.

25. An asymmetric digital subscriber line (ADSL) circuit, comprising:
   a single integrated circuit (IC) substrate to host the circuit;
   an analog front-end (AFE); and
   a digital signal processor (DSP) including bypass capacitors configured to provide charge for digital switching current;
   wherein the AFE and the DSP are formed on the single IC substrate; and
   wherein the AFE includes a mechanism for shielding one or more analog signal paths.

26. The ADSL circuit of claim 25, wherein the ADSL circuit is formed of a CMOS process.

27. The ADSL circuit of claim 26, wherein the AFE in positioned in a corner location of the IC substrate.

* * * * *

UNITED STATES PATENT AND TRADEMARK OFFICE
CERTIFICATE OF CORRECTION

PATENT NO. : 7,039,102 B2  Page 1 of 1
APPLICATION NO. : 10/347293
DATED : May 2, 2006
INVENTOR(S) : Pieter Vorenkamp It is certified that error appears in the above-identified patent and that said Letters Patent is hereby corrected as shown below:

Claim 2, Column 7, Line 31, -- analog front-end (ME) configured to -- should appear as "analog front-end (AFE) configured to"

Signed and Sealed this

Twenty-ninth Day of August, 2006

JON W. DUDAS
*Director of the United States Patent and Trademark Office*